US009537823B2

(12) United States Patent
Martini

(10) Patent No.: US 9,537,823 B2
(45) Date of Patent: *Jan. 3, 2017

(54) RESTRICTING COMMUNICATION OVER AN ENCRYPTED NETWORK CONNECTION TO INTERNET DOMAINS THAT SHARE COMMON IP ADDRESSES AND SHARED SSL CERTIFICATES

(71) Applicant: iBoss, Inc., San Diego, CA (US)

(72) Inventor: Paul Michael Martini, San Diego, CA (US)

(73) Assignee: iboss, Inc., San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/094,900

(22) Filed: Apr. 8, 2016

(65) Prior Publication Data
US 2016/0226824 A1 Aug. 4, 2016

Related U.S. Application Data

(63) Continuation of application No. 13/455,116, filed on Apr. 24, 2012, now Pat. No. 9,313,205.

(51) Int. Cl.
G06F 17/30 (2006.01)
H04L 29/06 (2006.01)
H04L 29/12 (2006.01)
H04L 29/08 (2006.01)

(52) U.S. Cl.
CPC ....... H04L 63/0209 (2013.01); H04L 61/1511 (2013.01); H04L 63/10 (2013.01); H04L 67/02 (2013.01)

(58) Field of Classification Search
CPC .... H04L 61/15; H04L 61/303; H04L 61/1511; H04L 67/2814; H04L 63/0236; H04L 63/166; G06F 17/30887
USPC .................................................. 726/26, 28
See application file for complete search history.

(56) References Cited

U.S. PATENT DOCUMENTS

| | | |
|---|---|---|
| 2002/0154627 A1 | 10/2002 | Abrol et al. |
| 2003/0028762 A1 | 2/2003 | Trilli et al. |
| 2005/0021848 A1 | 1/2005 | Jorgenson |
| 2005/0060535 A1 | 3/2005 | Bartas |
| 2005/0086385 A1 | 4/2005 | Rouleau |
| 2006/0045068 A1 | 3/2006 | Wu et al. |
| 2006/0212576 A1 | 9/2006 | Barkley et al. |
| 2006/0294199 A1 | 12/2006 | Bertholf |
| 2007/0180510 A1 | 8/2007 | Long et al. |
| 2008/0222306 A1 | 9/2008 | Bhakta et al. |
| 2010/0161765 A1 | 6/2010 | Yang |
| 2011/0252462 A1 | 10/2011 | Bonanno et al. |
| 2012/0290724 A1 | 11/2012 | Noro et al. |

Primary Examiner — Brian Shaw
(74) Attorney, Agent, or Firm — Fish & Richardson P.C.

(57) ABSTRACT

An apparatus prevents communication by a client device to a domain that cannot be uniquely identified by relocating the DNS mapping of the domain to a destination IP Address that is uniquely identifiable and that represents a location of an apparatus that provides a data path to the domain.

21 Claims, 7 Drawing Sheets

| USER DEVICE 110 | FILTER APPLIANCE 125 | RELAY SERVER 135 | DOMAIN SERVER 150 |
|---|---|---|---|
| SEND DNS QUERY FOR DOMAIN 502 | | | |
| | REMAP A PUBLICLY KNOWN IP ADDRESS OF THE DOMAIN TO A NON-LOCAL CONTROLLED IP ADDRESS 504 | | |
| RECEIVE THE NON-LOCAL CONTROLLED IP ADDRESS 506 | | | |
| ASSOCIATE THE DOMAIN WITH THE NON-LOCAL CONTROLLED IP ADDRESS 508 | | | |
| SEND SSL REQUEST USING THE NON-LOCAL CONTROLLED IP ADDRESS 510 | | | |
| | SEND THE SSL REQUEST TO THE RELAY SEVER IF THE NON-LOCAL CONTROLLED IP ADDRESS IS NOT BLOCKED FOR THE USER DEVICE 512 | | |
| | | RECEIVE THE SSL REQUEST 514 | |
| | | SEND SSL REQUEST 516 | |
| | | | RECEIVE SSL REQUEST 518 |
| | | | RESPOND TO SSL REQUEST 520 |
| | | RECEIVE THE RESPONSE 522 | |
| | | SEND THE RESPONSE 524 | |
| RECEIVE THE RESPONSE 526 | | | |

FIG. 5

RESTRICTING COMMUNICATION OVER AN ENCRYPTED NETWORK CONNECTION TO INTERNET DOMAINS THAT SHARE COMMON IP ADDRESSES AND SHARED SSL CERTIFICATES

FIELD

The present disclosure relates to computers and, more particularly, to monitoring and blocking access by a computer to particular websites.

BACKGROUND

Hardware based web filters are appliances that can be installed on a network inside a firewall to provide web filtering in a centralized place. The appliances also do not require the use of software to be installed on computers on the network making the appliances easier to configure and manage, especially in large environments.

Web filters not only block certain content from reaching a computer on the network, but the Web filters also log and generate reports based on the activity on the network. The activity report typically contains the computer or user activity including violations to the filtering policy. Web filtering reports for policy violations show web site activity as well as violating activity.

Web filters that block access for particular users or groups of users cannot block access to a domain that shares at least one IP address with another domain and that shares a certificate with another domain.

The Internet domain cannot be uniquely identified when the Internet domain has at least one IP address that is shared with another Internet domain and the Internet domain has a SSL certificate that is shared with another Internet domain. For example, the domain mail.google.com cannot be uniquely identified because mail.google.com shares a number of IP addresses with www.youtube.com and mail.google.com shares an SSL certificate having a domain name of '.google.com' with www.youtube.com. If either www.youtube.com and mail.google.com did not share at least one IP address or did not share a SSL certificate, then the IP address of mail.google.com could be uniquely identified and then mail.google.com could be blocked as required.

SUMMARY

In one aspect, a method of a filter appliance includes receiving a communication from an electronic device, the communication including a reference to a network domain that cannot be uniquely identified and remapping the network domain to an IP address having a unique identity of the network domain, wherein the IP address is not a publicly known IP address of the network domain.

In another aspect, an apparatus prevents communication by a client device to a domain that cannot be uniquely identified by relocating the DNS mapping of the domain to a destination IP Address that is uniquely identifiable and that represents a location of an apparatus that provides a data path to the domain.

In yet another aspect, a method includes receiving from a client device a DNS Query for an Internet domain name that cannot be uniquely identified, determining whether or not Internet domain name is designated as a remapped domain name, sending to the client device a spoofed destination IP address in response to the DNS Query, receiving from the client device a nonsecure HTTP request transaction using the spoofed destination IP address, determining whether or not the nonsecure HTTP request is blocked for access by the client device, managing access to the Internet domain name that cannot be uniquely identified by replacing the destination IP address of the nonsecure HTTP request with an IP address than can be uniquely identified, when the nonsecure HTTP request for access to the Internet domain name is not blocked, sending a blocked access message to the client device, when the nonsecure HTTP request for access to the Internet domain name is blocked.

In a further aspect, a method of managing access to an Internet domain name that cannot be uniquely identified by an apparatus includes receiving a nonsecure HTTP request of a client device, the HTTP request having a spoofed destination IP address and a source IP address, creating a session that associates the client device to the HTTP request, changing the destination address in the HTTP request to a DNS mapped IP address of the Internet domain name, for each packet in the HTTP request, yielding a changed HTTP request, changing the source IP address in the HTTP request from a client IP address to an IP address of a Relay Server, for each packet in the HTTP request, yielding the changed HTTP request, sending to a domain server that is associated with the Internet domain name, each packet in the changed HTTP request, receiving from the domain server a response to the changed HTTP request, associating the response to client device in reference to the session, the response having a destination IP address and source IP address, changing the destination IP address in the response to the spoofed destination IP address, yielding a changed response, changing the source IP address in the response to the client IP address, yielding the changed response, and forwarding the changed response to the client device.

Systems, clients, servers, methods, and computer-readable media of varying scope are described herein. In addition to the aspects and advantages described in this summary, further aspects and advantages will become apparent by reference to the drawings and by reading the detailed description that follows.

BRIEF DESCRIPTION OF THE DRAWINGS

FIG. 5 is a sequence diagram of a technique to resolve domain names that cannot be uniquely identified to the extent that traffic associated with the domain can be filtered for a particular user device, according to an implementation;

For purposes of clarity and brevity, like elements and components will bear the same designations and numbering throughout the Figures.

DETAILED DESCRIPTION

Figure 1:
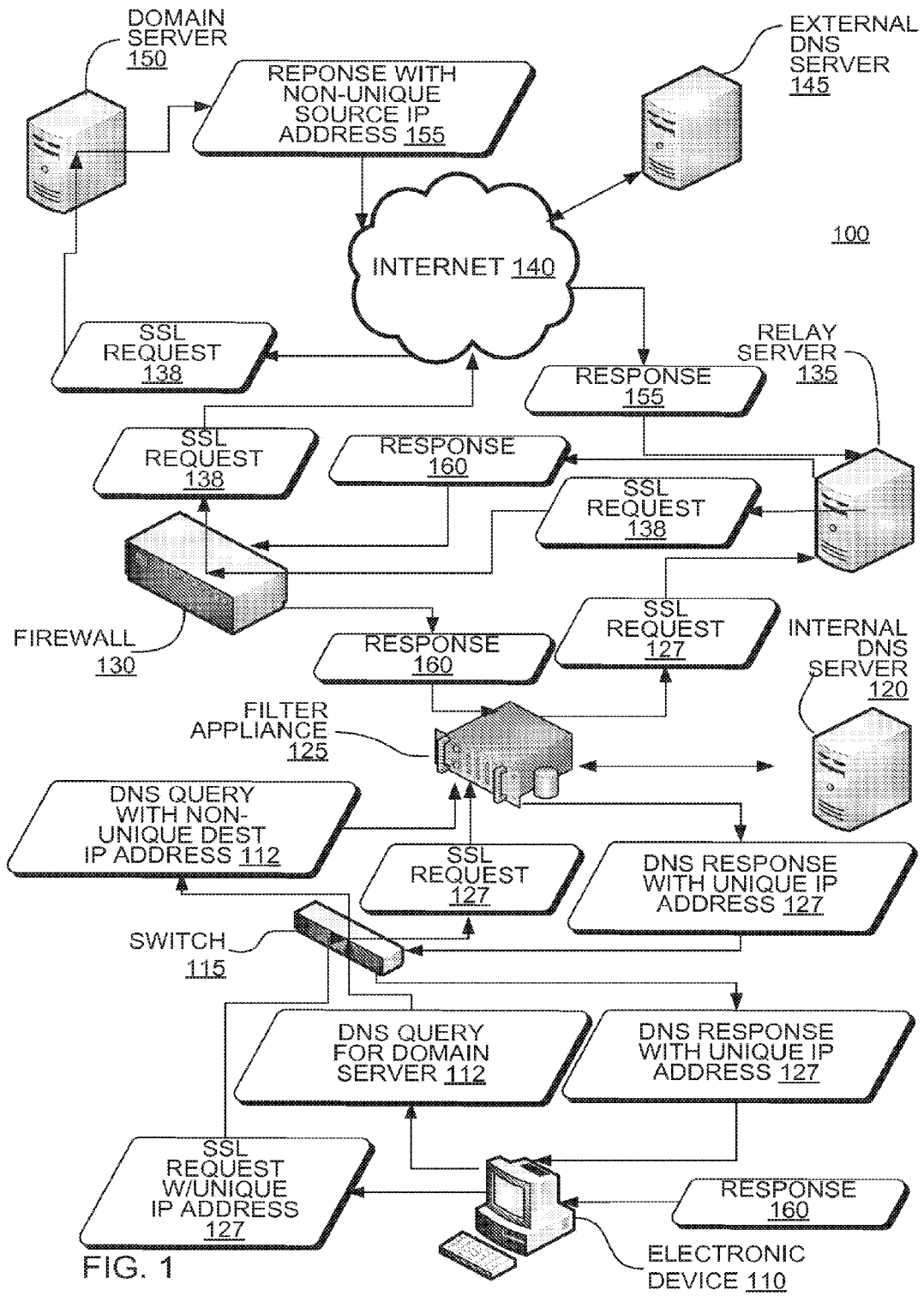
FIG. 1 is a block diagram of a system that manages access to a network domain that cannot be uniquely identified, according to an implementation.

In the following detailed description, reference is made to the accompanying drawings that form a part hereof, and in which is shown by way of illustration specific implementations which can be practiced. The implementations are described in sufficient detail to enable those skilled in the art to practice the implementations, and it is to be understood that other implementations can be utilized and that logical, mechanical, electrical and other changes can be made without departing from the scope of the implementations. The following detailed description is, therefore, not to be taken in a limiting sense.

It will be appreciated that for simplicity and clarity of illustration, where considered appropriate, reference numerals can be repeated among the figures to indicate corresponding or analogous elements. In addition, numerous specific details are set forth in order to provide a thorough understanding of the implementations described herein. However, it will be understood by those of ordinary skill in the art that the implementations described herein can be practiced without the specific details. In other instances, well-known methods, procedures and components have not been described in detail so as not to obscure the implementations described herein. Also, the description is not to be considered as limiting the scope of the implementations described herein.

FIG. 1 is a block diagram of a system 100 that manages access to a network domain that cannot be uniquely identified, according to an implementation.

System 100 includes a client electronic device 102 that is operable to connect to a network, such as the Internet 104. Examples of the electronic device 102 include the computation resource 602 in FIG. 6 (otherwise known as a computer) and the mobile device 700 in FIG. 7.

In FIG. 1, a client device or other user device 110 (e.g. the electronic device 110 in FIG. 1, the computer 602 in FIG. 6 or the mobile device 700 in FIG. 7) transmits to a switch 115 a domain name system (DNS) query for an Internet domain that cannot be uniquely identified. A DNS Query 112 is a request for the IP address of an Internet domain. The Internet domain cannot be uniquely identified because the Internet domain has at least one IP address that is shared with another Internet domain and the Internet domain has a SSL certificate that is shared with another Internet domain. For example, the domain mail.google.com cannot be uniquely identified because mail.google.com and www.youtube.com share a number of IP addresses in the range of 74.125.20.1-74.125.20.3 and mail.google.com and www.youtube.com share an SSL certificate having a domain name of '.google.com'. The DNS Query 112 is defined in RFC 1035 published in November 1987 by the Internet Engineering Task Force at do Association Management Solutions, LLC (AMS), 48377 Fremont Blvd., Suite 117, Fremont, Calif. 94538.

The Switch 115 forwards the DNS Query 112 to a Filter Appliance 125. The Filter Appliance 125 provides a Response 127 having unique identity of the Internet domain in the DNS Query 112 by remapping the network domain to an IP address that is different than the assigned IP address of the Internet domain. In some implementations, the IP address that is different than the publicly known IP address of the Internet network domain is outside the local subnet of the user device 110. In some embodiments, the IP address that is different than the publicly known IP address of the network domain is a non-local controlled IP address. The non-local controlled IP address comprises an IP address that is non-local to the user device 110. For example, the Filter Appliance 125 sends a Response 127 to the DNS Query 112 that includes an IP address of a Relay Server 135 such as 212.33.45.10 to the user device 110. The Relay Server 135 can be located anywhere in the system 100, such as connected to the Internet, located in the Filter Appliance 125 or located on the local subnet as the user device 110. One example of the non-local controlled IP address is the spoofed IP address disclosed in method 200 in FIG. 2 and method 300 in FIG. 3-4. In some implementations, the Filter Appliance 125 generates the IP address that is different than the publicly known IP address of the network domain in reference to an Internal DNS Server 120. The Internal DNS Server 120 is accessible only within the local subnet.

The user device 110 receives the non-local controlled IP address and associates the non-local controlled IP address with the domain. For example, the user device 110 receives the 212.33.45.10 IP address and associates the IP address 212.33.45.10 with the domain 'mail.google.com'. Thereafter, the user device 110 transmits a SSL 127 request that includes the non-local controlled IP address. For example, the user device 110 transmits the SSL Request 127 that includes the 212.33.45.10 IP address.

The Filter Appliance 125 receives the SSL Request 127 that includes the non-local controlled IP address and compares the 212.33.45.10 IP address to a database of blocked IP addresses for the user device 110. If the 212.33.45.10 IP address is not blocked for the user 110, the filtering device 125 transmits the SSL Request 127 that includes the 212.33.45.10 IP address to the Relay Server 135. For example, Filter Appliance 125 receives the SSL Request 127 that includes the 212.33.45.10 IP address and compares the 212.33.45.10 IP address to a database of blocked IP addresses for the user device 110. If the 212.33.45.10 IP address is not blocked for the user 110, the filtering device 125 transmits the SSL Request 127 that includes the 212.33.45.10 IP address to the Relay Server 135.

The Relay Server 135 receives the SSL Request 127 that includes the non-local controlled IP address, changes the non-local controlled IP address in the SSL Request 127 to a public IP address of the domain, and passes the SSL Request 138 that includes the public IP address of the domain server 140 to the domain server 150. For example, the Relay Server 135 receives the SSL Request 127 that includes the 212.33.45.10 IP address and passes the SSL Request 138 that includes IP address 74.125.20.1 to the domain server 150.

The domain server 150 receives the SSL Request 138 that includes public IP address of the domain server 140 and responds to the SSL Request 138. For example, the domain server 150 receives the SSL Request 138 that includes the 74.125.20.1 IP address and responds to the SSL Request 138 address. The Response 155 by the Domain Server 150 has a Source IP address of the public IP address of the domain server, such as 74.125.20.1.

The Relay Server 135 receives the response 155 and replaces the Source IP address in the response from the Domain Server 150 IP address such as 74.125.20.1, to the IP address that is different than the publicly known IP address of the Internet network domain, such as 212.33.45.10 and passes the modified Response 160 to the user device 110 through the Firewall 130, the Filter Appliance 125 and the Switch 115.

The user device 110 receives the response 160.

Figure 2:
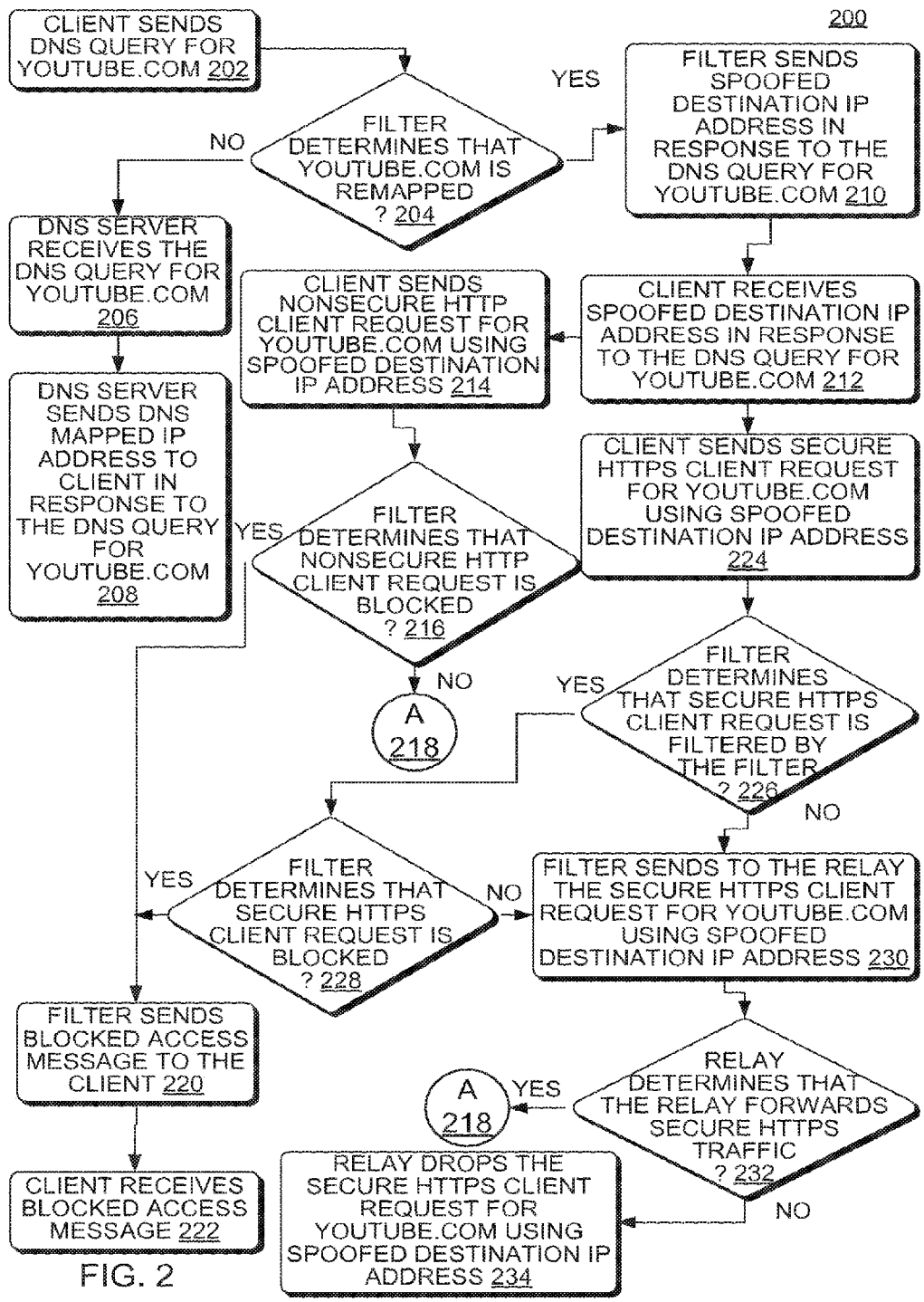
FIG. 2 is a flowchart of a method that manages access to a network domain that cannot be uniquely identified, according to an implementation.

FIG. 2 is a flowchart of a method 200 that manages access to a network domain that cannot be uniquely identified, according to an implementation.

In method 200, the client device 110 sends the DNS Query 112 for 'youtube.com' or another Internet domain that cannot be uniquely identified, at block 202. The DNS Query 112 includes the plain text 'youtube.com' in the Destination IP Address field in the IP packet header of the DNS Query 112. The purpose of the DNS Query 112 is to determine the IP address of the domain 'youtube.com' for use in subsequent TCP commands to the domain 'youtube.com'. In sending the DNS Query 112 for 'youtube.com', the conventional response to client device 100 to the DNS Query 112 is a publicly mapped IP address for 'youtube.com'.

In method 200, the Filter Appliance 125 intercepts the DNS Query 112. In response the Filter Appliance 125 inspects the plain text representation of the Destination IP Address in the IP packet header of the DNS Query 112 and the Filter Appliance 125 at block 204 determines whether or not 'youtube.com' is designated as a remapped domain name. Domain names are designated as remapped by the Filter Appliance 125 because of ambiguity in the domain name when the domain name has at least one IP address that is shared with another domain name in the external DNS server 145 and when the domain has a SSL certificate that is shared with another domain.

When the Filter Appliance 125 determines that 'youtube.com' is not designated as a remapped domain name at block 204, the Filter Appliance 125 forwards the DNS Query 112 for 'youtube.com' to the DNS Server 145. The DNS Server 145 receives from the Filter Appliance 125 the DNS Query 112 for 'youtube.com' at block 206, and the Filter Appliance 125 processes the DNS Query 112 without any restrictions that are described in actions 210-234 of method 200 in FIG. 2 and in method 300 in FIG. 3-4 in which the DNS Server 145 sends determines or identifies the DNS mapped IP address of 'youtube.com' to the client device 110 in response to the DNS Query 112 for 'youtube.com' 208.

When the Filter Appliance 125 at block 204 determines that 'youtube.com' is designated as a remapped domain name, the Filter Appliance 125 sends a spoofed destination IP address in response to the DNS Query 112 for 'youtube.com' 210.

In some implementations, the spoofed destination IP address is an IP address associated with the Relay Server 135. As a result, when the IP address that associated with the Relay Server 135 is used as a destination IP address in a TCP or UDP packet(s), the packet(s) are delivered to the Relay Server 135.

Thereafter, the Client device 110 receives the spoofed destination IP address in response to the DNS Query 112 for 'youtube.com', at block 212.

In some implementations, the Client device 110 initiates a nonsecure HTTP transaction (items 214-222 in method 200 in FIG. 2) and/or the Client device 110 initiates a secure HTTPS transaction (items 224-234 in method 200 in FIG. 2). HTTP is defined in RFC 2616 published in June 1999 by the Internet Engineering Task Force at c/o Association Management Solutions, LLC (AMS), 48377 Fremont Blvd., Suite 117, Fremont, Calif. 94538.

Figure 3:
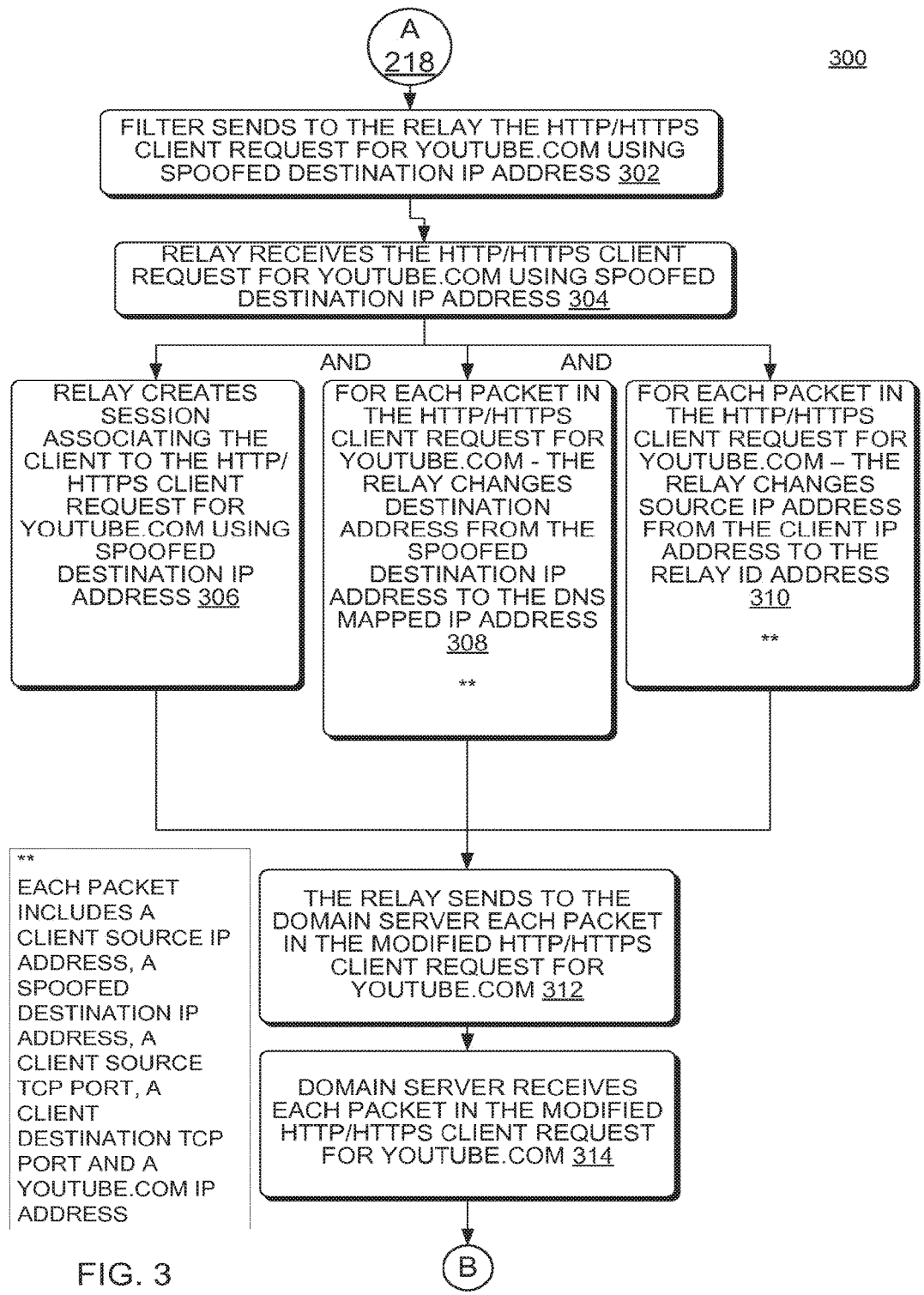
FIG. 3-4 is a flowchart of a method that manages access to a network domain that cannot be uniquely identified by replacing the network domain that cannot be uniquely identified with an identity than can be uniquely identified, according to an implementation.
Figure 4:
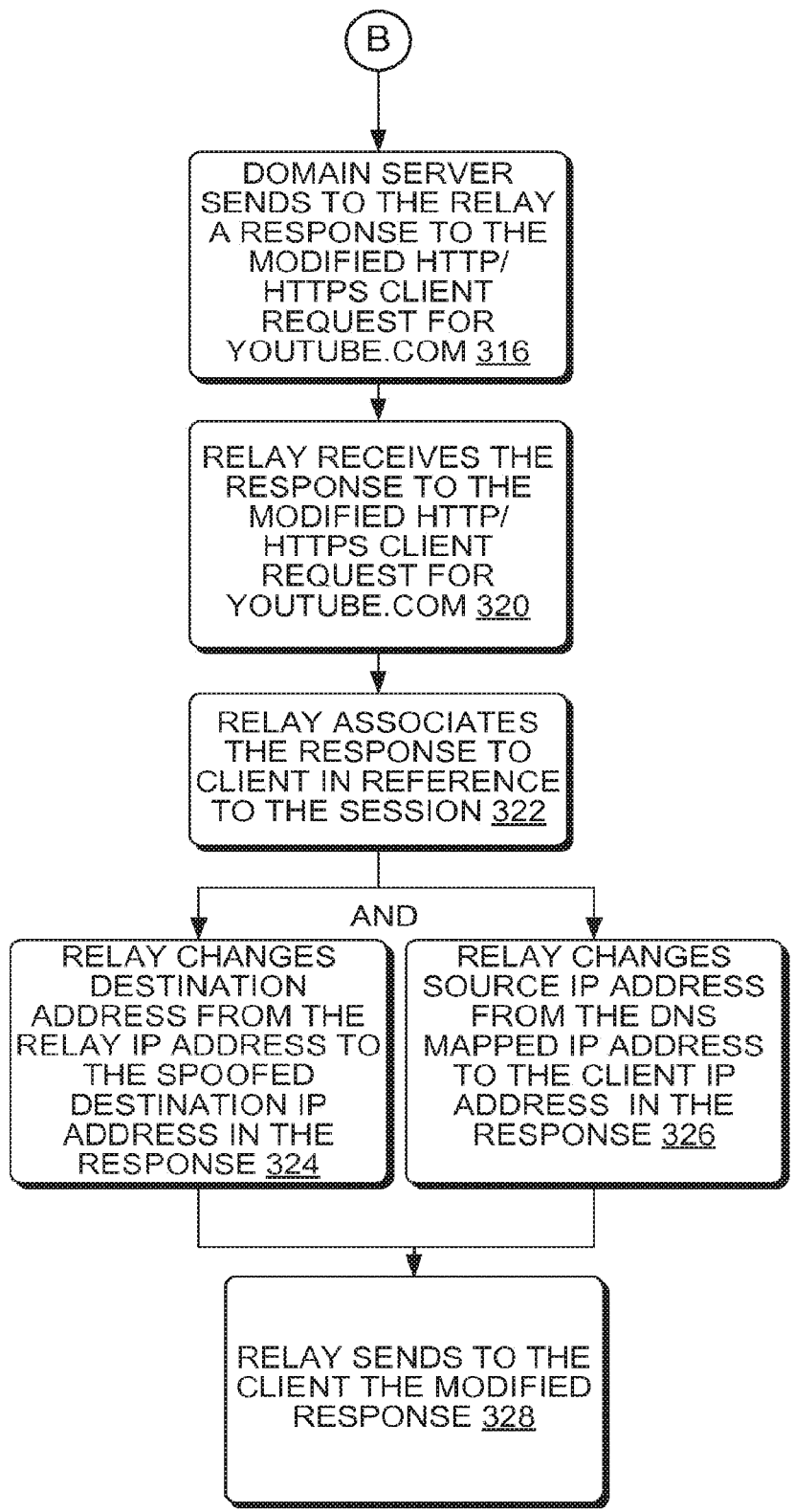

In the nonsecure http transaction, the Client device 110 sends a nonsecure HTTP client device request for 'youtube.com' using the spoofed destination IP address, at block 214. The nonsecure HTTP client device request for 'youtube.com' that uses the spoofed destination IP address has a destination IP address in the IP packet header that is set to the spoofed destination IP address that was received from the Filter Appliance 125 in response to the DNS Query 112 for 'youtube.com. As a result, the nonsecure HTTP client device request for 'youtube.com' is directed to the spoofed destination IP address and the nonsecure HTTP client device request for 'youtube.com' is not directed to the DNS mapped IP address for 'youtube.com'. Thereafter, the Filter Appliance 125 determines whether or not the nonsecure HTTP client device request for 'youtube.com' is blocked for access by the Client device 110, at block 216. The blocked access is determined or not by the Filter Appliance 125 by searching a database or other list of blocked domains for an indication or representation that the domain 'youtube.com' is blocked for access by the Client device 110. When the Filter Appliance 125 determines that the nonsecure HTTP client device request for access to domain 'youtube.com' is not blocked at block 216, method 300 in FIG. 3-4 is performed at block 218. When the Filter Appliance 125 determines that the nonsecure HTTP client device 110 requests for access to domain 'youtube.com' is blocked at 216, the Filter Appliance 125 sends a blocked access message to the client device 110 at block 220, and subsequently, the Client device 110 receives the blocked access message at block 222.

In the secure HTTPS transaction, the Client device 110 sends a secure HTTPS request using a SSL certificate for 'youtube.com' using the spoofed destination IP address, at block 224. The Filter Appliance 125 determines whether or not the secure HTTPS transaction is filtered by the Filter Appliance 125 at block 226. When the Filter Appliance 125 determines that the secure HTTPS transaction is filtered by the Filter Appliance 125, the Filter Appliance 125 determines whether or not the secure HTTPS client device request for 'youtube.com' is blocked for access by the Client device 110, at block 228. The blocked access is determined or not by the Filter Appliance 125 by searching a database or other list of blocked domains for an indication or representation that the domain 'youtube.com' is blocked for access by the Client device 110. When the Filter Appliance 125 determines that the secure HTTPS client device request for access to domain youtube.com' is blocked at 228, the Filter Appliance 125 sends a blocked access message to the client device 110 at block 220, and subsequently, the Client device 110 receives the blocked access message at block 222. HTTPS is defined in RFC 2818 published in May 2000 by the Internet Engineering Task Force at do Association Management Solutions, LLC (AMS), 48377 Fremont Blvd., Suite 117, Fremont, Calif. 94538.

When the Filter Appliance 125 determines that the secure HTTPS client device request for access to domain youtube.com' is not blocked at block 228, the Filter Appliance 125 sends to the Relay Server 135 the secure HTTPS client device request for 'youtube.com' using the spoofed destination IP address, at block 230. Thereafter, the Relay Server 135 receives the secure HTTPS client device request for 'youtube.com' using the spoofed destination IP address and the Relay Server 135 determines whether or not the Relay Server 135 forwards secure HTTPS traffic, at block 232. When the Relay Server 135 determines that the Relay Server 135 forwards secure HTTPS traffic, method 300 in FIG. 3-4 is performed at block 218. When the Relay Server 135 determines that the Relay Server 135 does not forward secure HTTPS traffic, the Relay Server 135 drops the secure HTTPS client device request for 'youtube.com' using the spoofed destination IP address at block 234.

FIG. 3-4 is a flowchart of a method 300 that manages access to a network domain that cannot be uniquely identified by replacing the network domain that cannot be uniquely identified with an identity than can be uniquely identified, according to an implementation.

Method 300 includes the Filter Appliance 125 sending to the Relay Server 135 the HTTP/HTTPS client request for youtube.com using the spoofed destination IP address, at block 302. In one implementation, the HTTP/HTTPS client request for youtube.com is either the nonsecure HTTP transaction referenced in items 214-222 in method 200 in FIG. 2. In another implementation, the HTTP/HTTPS client request for youtube.com is the secure HTTPS transaction in items 224-234 in method 200 in FIG. 2.

Thereafter, method 300 includes the Relay Server 135 receiving the HTTP/HTTPS client request for youtube.com that includes the spoofed destination IP address, at block 304. Each packet in the HTTP/HTTPS client request includes a client source IP address, a spoofed destination IP address, a client source TCP port, a client destination TCP port and a youtube.com IP address. The method includes the Relay Server 135 creating a session that associates the client device 110 to the HTTP/HTTPS client request for youtube.com that includes the spoofed destination IP address, at block 306.

In an important action of method 300, the Relay Server 135 changes or replaces the destination address from the spoofed destination IP address to the DNS mapped IP address, for each packet in the HTTP/HTTPS client request for youtube.com, at block 308. Block 308 modifies the HTTP/HTTPS client request for youtube.com.

In another important action of method 300, the Relay Server 135 changes source IP address from the client IP address to the Relay Server 135 IP address, for each packet in the HTTP/HTTPS client request for youtube.com, at block 310. Block 308 modifies the HTTP/HTTPS client request for youtube.com.

Thereafter, method 300 includes the Relay Server 135 sending to the Domain Server 145 each packet in the modified HTTP/HTTPS client request for youtube.com, at block 312.

Method 300 also includes the Domain Server 145 receiving from the Relay Server 135 each packet in the modified HTTP/HTTPS client request for youtube.com, at block 314. The Domain Server 135 generates a response to the modified HTTP/HTTPS client request for youtube.com.

Thereafter, the Domain Server 145 sends to the Relay Server 135 the generated response to the modified HTTP/HTTPS client request for youtube.com, at block 316.

Thereafter, the Relay Server 135 receives the response to the modified HTTP/HTTPS client request for youtube.com, at block 320, and the Relay Server 135 associates the response to client device 110 in reference to the session, at block 322. The Relay Server 135 changes the destination address from the relay IP address to the spoofed destination IP address in the response, at block 324 and the Relay Server 135 changes the source IP address from the DNS mapped IP address to the client IP address in the response, at block 326.

Thereafter, the Relay Server 135 sends to the client the modified response, at block 328.

FIG. 5 is a sequence diagram 500 of a technique to resolve domain names that cannot be uniquely identified to the extent that traffic associated with the domain can be filtered for a particular user device, according to an implementation.

In FIG. 5, a client device or other user device 110 (e.g. the electronic device 110 in FIG. 1, the computer 602 in FIG. 6 or the mobile device 700 in FIG. 7) a domain name system (DNS) query for an Internet domain that cannot be uniquely identified. A DNS Query 112 is a request for the IP address of an Internet domain. The Internet domain cannot be uniquely identified because the Internet domain has at least one IP address that is shared with another Internet domain and the Internet domain has a SSL certificate that is shared with another Internet domain. For example, the domain mail.google.com cannot be uniquely identified because mail.google.com and www.youtube.com share a number of IP addresses in the range of 74.125.20.1-74.125.20.3 and mail.google.com and www.youtube.com share an SSL certificate having a domain name of '.google.com'. The DNS Query 112 is defined in RFC 1035 published in November 1987 by the Internet Engineering Task Force at c/o Association Management Solutions, LLC (AMS), 48377 Fremont Blvd., Suite 117, Fremont, Calif. 94538.

The Filter Appliance 125 provides a unique identity of the Internet domain by remapping the network domain to an IP address that is different than the assigned IP address of the network domain, at 504. In some implementations, the IP address that is different than the publicly known IP address of the network domain is outside the local subnet of the user device 110. In some embodiments, the IP address that is different than the publicly known IP address of the network domain is a non-local controlled IP address. The non-local controlled IP address comprises an IP address that is non-local to the user device 110. For example, the Filter Appliance 125 responds to the DNS Query 112, at 502 by providing an IP address of the Relay Server 135 such as 212.33.45.10 to the user device 110. The Relay Server 135 can be located anywhere in the system, such as connected to the Internet, located in the Filter Appliance 125 or located on the local subnet as the user device 110. One example of the non-local controlled IP address is the spoofed IP address disclosed in method 200 in FIG. 2 and method 300 in FIG. 3-4.

The user device 110 receives the non-local controlled IP address, at 506 and associates the non-local controlled IP address with the domain, at 508. For example, the user device 110 receives the 212.33.45.10 IP address, at 506 and associates the IP address 212.33.45.10 with the domain 'mail.google.com'. Thereafter, the user device 110 transmits the SSL Request 127 that includes the non-local controlled IP address, at 510. For example, the user device 110 transmits a SSL Request 127 that includes the 212.33.45.10 IP address.

The Filter Appliance 125 receives the SSL Request 127 that includes the non-local controlled IP address and compares the 212.33.45.10 IP address to a database of blocked IP addresses for the user device 110. If the 212.33.45.10 IP address is not blocked for the user 110, the filtering device 125 transmits the SSL Request 127 that includes the 212.33.45.10 IP address to the Relay Server 135. For example, Filter Appliance 125 receives the SSL Request 127 that includes the 212.33.45.10 IP address and compares the 212.33.45.10 IP address to a database of blocked IP addresses for the user device 110. If the 212.33.45.10 IP address is not blocked for the user 110, the filtering device 125 transmits the SSL Request 127 that includes the 212.33.45.10 IP address to the Relay Server 135.

The Relay Server 135 receives the SSL Request 127 that includes the non-local controlled IP address, at 514 and passes the SSL Request 127 that includes the non-local controlled IP address to the domain server 150, at 516. For example, the Relay Server 135 receives the SSL Request 127 that includes the 212.33.45.10 IP address, at 514 and passes the SSL Request 127 that includes the 212.33.45.10 IP address to the domain server 150, at 516.

The domain server 150 receives the SSL Request 127 that includes the non-local controlled IP address, at 518 and responds to the SSL Request 127 that includes the non-local controlled IP address, at 520. For example, the domain server 150 receives the SSL Request 127 that includes the 212.33.45.10 IP address, at 518 and responds to the SSL Request 127 that includes the 212.33.45.10 IP address, at 520.

The Relay Server 135 receives the SSL Request that includes the non-local controlled IP address, changes the non-local controlled IP address in the SSL Request to a public IP address of the domain, and passes the SSL Request 138 that includes the public IP address of the domain server 140 to the domain server 150. For example, the Relay Server 135 receives the SSL Request that includes the 212.33.45.10 IP address and passes the SSL Request that includes IP address 74.125.20.1 to the domain server 150.

The domain server 150 receives the SSL Request 138 that includes public IP address of the domain server 140 and responds to the SSL Request. For example, the domain server 150 receives the SSL Request that includes the 74.125.20.1 IP address and responds to the SSL Request address. The Response 155 by the Domain Server 150 has a Source IP address of the public IP address of the domain server, such as 74.125.20.1.

The Relay Server 135 receives the response 155 and replaces the Source IP address in the response from the Domain Server 150 IP address such as 74.125.20.1, to the IP address that is different than the publicly known IP address of the Internet network domain, such as 212.33.45.10 and passes the modified Response to the user device 110 through the Firewall 130, the Filter Appliance 125 and the Switch 115.

The user device 110 receives the response, at 526.

Figure 6:
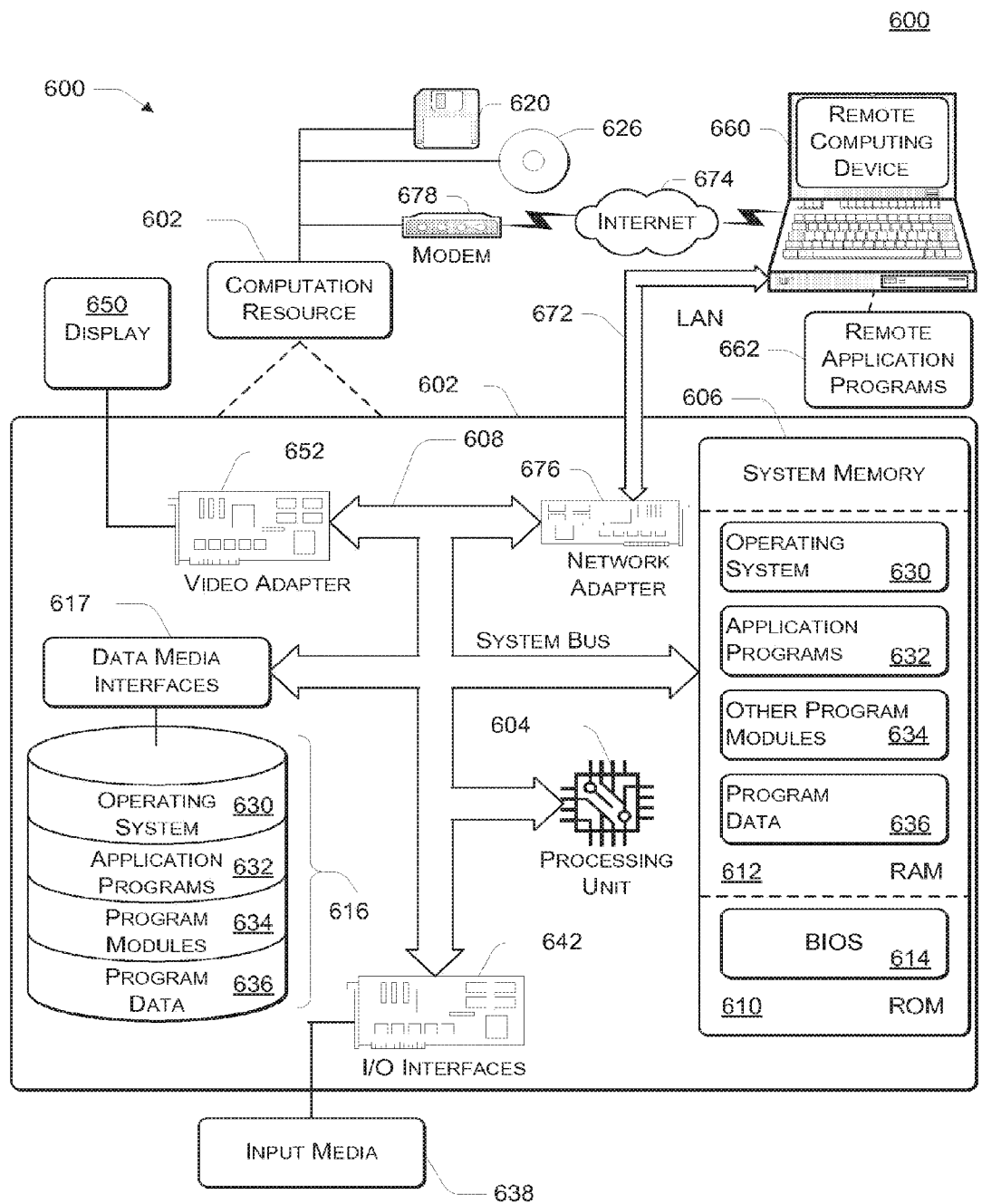
FIG. 6 illustrates an example of a general computer environment 600, according to an implementation.

FIG. 6 illustrates an example of a general computer environment 600 useful in the context of the environment of electronic device 102, according to an implementation. The general computer environment 600 includes a computation resource 602 capable of implementing the processes described herein. It will be appreciated that other devices can alternatively used that include more components, or fewer components, than the components illustrated in FIG. 6.

The illustrated operating environment 600 is only one example of a suitable operating environment, and the example described with reference to FIG. 6 is not intended to suggest any limitation as to the scope of use or functionality of the implementations of this disclosure. Other well-known computing systems, environments, and/or configurations can be suitable for implementation and/or application of the subject matter disclosed herein.

The computation resource 602 includes one or more processors or processing units 604, a system memory 606, and a bus 608 that couples various system components including the system memory 606 to processor(s) 604 and other elements in the environment 600. The bus 608 represents one or more of any of several types of bus structures, including a memory bus or memory controller, a peripheral bus, an accelerated graphics port and a processor or local bus using any of a variety of bus architectures, and can be compatible with SCSI (small computer system interconnect), or other conventional bus architectures and protocols.

The system memory 606 includes nonvolatile read-only memory (ROM) 610 and random access memory (RAM) 612, which can or can not include volatile memory elements. A basic input/output system (BIOS) 614, containing the elementary routines that help to transfer information between elements within computation resource 602 and with external items, typically invoked into operating memory during start-up, is stored in ROM 610.

The computation resource 602 further can include a non-volatile read/write memory 616, represented in FIG. 6 as a hard disk drive, coupled to bus 608 via a data media interface 617 (e.g., a SCSI, ATA, or other type of interface); a magnetic disk drive (not shown) for reading from, and/or writing to, a removable magnetic disk 620 and an optical disk drive (not shown) for reading from, and/or writing to, a removable optical disk 626 such as a CD, DVD, or other optical media.

The non-volatile read/write memory 616 and associated computer-readable media provide nonvolatile storage of computer-readable instructions, data structures, program modules and other data for the computation resource 602. Although the exemplary environment 600 is described herein as employing a non-volatile read/write memory 616, a removable magnetic disk 620 and a removable optical disk 626, other types of computer-readable media which can store data that is accessible by a computer, such as magnetic cassettes, FLASH memory cards, random access memories (RAMs), read only memories (ROM), and the like, can also be used in the exemplary operating environment.

A number of program modules can be stored via the non-volatile read/write memory 616, magnetic disk 620, optical disk 626, ROM 610, or RAM 612, including an operating system 630, one or more application programs 632, other program modules 634 and program data 636. Examples of computer operating systems conventionally employed for some types of three-dimensional and/or two-dimensional medical image data include the NUCLEUS® operating system, the LINUX® operating system, and others, for example, providing capability for supporting application programs 632 using, for example, code modules written in the C++® computer programming language.

A user can enter commands and information into computation resource 602 through input devices such as input media 638 (e.g., keyboard/keypad, tactile input or pointing device, mouse, foot-operated switching apparatus, joystick, touchscreen or touchpad, microphone, antenna etc.). Such input devices 638 are coupled to the processing unit 604 through a conventional input/output interface 642 that is, in turn, coupled to the system bus. A monitor 650 or other type of display device is also coupled to the system bus 608 via an interface, such as a video adapter 652.

The computation resource 602 can include capability for operating in a networked environment (as illustrated in FIG. 1, for example) using logical connections to one or more remote computers, such as a remote computer 660. The remote computer 660 can be a personal computer, a server, a router, a network PC, a peer device or other common network node, and typically includes many or all of the elements described above relative to the computation resource 602. In a networked environment, program modules depicted relative to the computation resource 602, or portions thereof, can be stored in a remote memory storage device such as can be associated with the remote computer 660. By way of example, remote application programs 662 reside on a memory device of the remote computer 660. The logical connections represented in FIG. 6 can include interface capabilities, e.g., such as interface capabilities 652 (FIG. 1) a storage area network (SAN, not illustrated in FIG. 6), local area network (LAN) 672 and/or a wide area network (WAN) 674, but can also include other networks.

Such networking environments are commonplace in modern computer systems, and in association with intranets and the Internet. In certain implementations, the computation resource 602 executes an Internet Web browser program (which can optionally be integrated into the operating system 630), such as the "Internet Explorer®" Web browser manufactured and distributed by the Microsoft Corporation of Redmond, Wash.

When used in a LAN-coupled environment, the computation resource 602 communicates with or through the local area network 672 via a network interface or adapter 676. When used in a WAN-coupled environment, the computation resource 602 typically includes interfaces, such as a modem 678, or other apparatus, for establishing communications with or through the WAN 674, such as the Internet. The modem 678, which can be internal or external, is coupled to the system bus 608 via a serial port interface.

In a networked environment, program modules depicted relative to the computation resource 602, or portions thereof, can be stored in remote memory apparatus. It will be appreciated that the network connections shown are exemplary, and other means of establishing a communications link between various computer systems and elements can be used.

A user of a computer can operate in a networked environment 600 using logical connections to one or more remote computers, such as a remote computer 660, which can be a personal computer, a server, a router, a network PC, a peer device or other common network node. Typically, a remote computer 660 includes many or all of the elements described above relative to the computer 600 of FIG. 6.

The computation resource 602 typically includes at least some form of computer-readable media. Computer-readable media can be any available media that can be accessed by the computation resource 602. By way of example, and not limitation, computer-readable media can comprise computer storage media and communication media.

Computer storage media include volatile and nonvolatile, removable and non-removable media, implemented in any method or technology for storage of information, such as computer-readable instructions, data structures, program modules or other data. The term "computer storage media" includes, but is not limited to, RAM, ROM, EEPROM, FLASH memory or other memory technology, CD, DVD, or other optical storage, magnetic cassettes, magnetic tape, magnetic disk storage or other magnetic storage devices, or any other media which can be used to store computer-intelligible information and which can be accessed by the computation resource 602.

Communication media typically embodies computer-readable instructions, data structures, program modules.

By way of example, and not limitation, communication media include wired media, such as wired network or direct-wired connections, and wireless media, such as acoustic, RF, infrared and other wireless media. The scope of the term computer-readable media includes combinations of any of the above.

Figure 7:
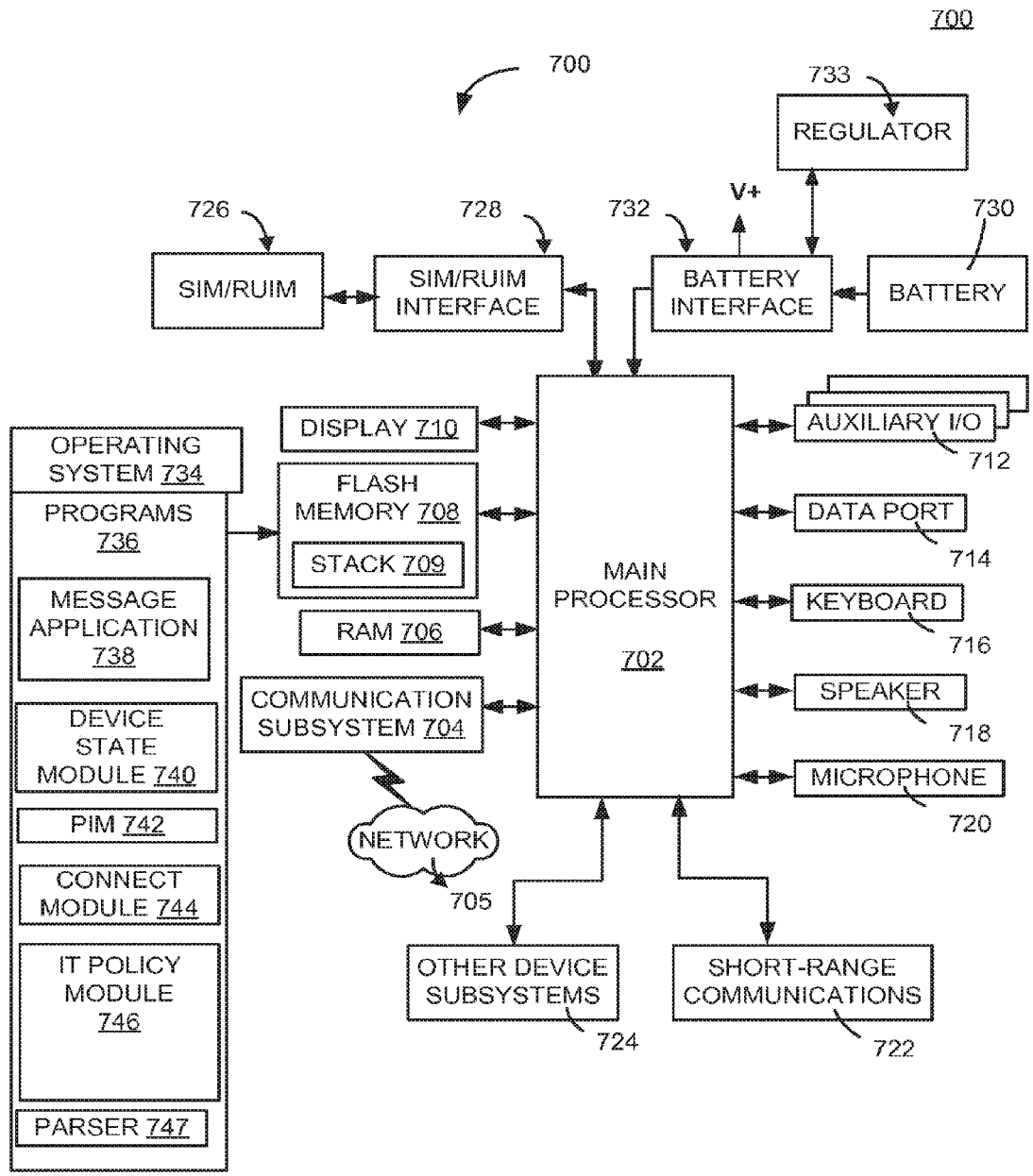
FIG. 7 is a block diagram of a mobile device, according to an implementation.

FIG. 7 is a block diagram of a mobile device 700, according to an implementation. The mobile device 700 is a two-way communication device with advanced data communication capabilities including the capability to communicate with other mobile devices or computer systems through a network of transceiver stations. The mobile device may also have the capability to allow voice communication. Depending on the functionality provided by the mobile device, it may be referred to as a data messaging device, a two-way pager, a cellular telephone with data messaging capabilities, a wireless Internet appliance, or a data communication device (with or without telephony capabilities).

Mobile device is one implementation of monitored computer 42 in FIG. 1 or 46 recording-source-computer 46 in FIG. 2. The mobile device 700 includes a number of components such as a main processor 702 that controls the overall operation of the mobile device 700. Communication functions, including data and voice communications, are performed through a communication subsystem 704. The communication subsystem 704 receives messages from and sends messages to wireless networks 705. The wireless networks 705 include the Wi-Fi access point 104 and the LTE network 112 in FIG. 1. In other implementations of the mobile device 700, the communication subsystem 704 can be configured in accordance with the Global System for Mobile Communication (GSM), General Packet Radio Services (GPRS), Enhanced Data GSM Environment (EDGE), Universal Mobile Telecommunications Service (UMTS), data-centric wireless networks, voice-centric wireless networks, and dual-mode networks that can support both voice and data communications over the same physical base stations. Combined dual-mode networks include, but are not limited to, Code Division Multiple Access (CDMA) or CDMA2000 networks, GSM/GPRS networks (as mentioned above), and future third-generation (3G) networks like EDGE and UMTS. Some other examples of data-centric networks include Wi-Fi 802.11, Mobitex™ and DataTAC™ network communication systems. Examples of other voice-centric data networks include Personal Communication Systems (PCS) networks like GSM and Time Division Multiple Access (TDMA) systems.

The wireless link connecting the communication subsystem 704 with the wireless network 705 represents one or more different Radio Frequency (RF) channels. With newer network protocols, the RF channels are capable of supporting both circuit switched voice communications and packet switched data communications.

The main processor 702 also interacts with additional subsystems such as a Random Access Memory (RAM) 706, a flash memory 708, a display 710, an auxiliary input/output (I/O) subsystem 712, a data port 714, a keyboard 716, a speaker 718, a microphone 720, short-range communications 722 and other device subsystems 724. The flash memory 708 includes a stack 709.

Some of the subsystems of the mobile device 700 perform communication-related functions, whereas other subsystems may provide "resident" or on-device functions. By way of example, the display 710 and the keyboard 716 may be used for both communication-related functions, such as entering a text message for transmission over the wireless network 705, and device-resident functions such as a calculator or task list.

The mobile device 700 can send and receive communication signals over the wireless network 705 after required network registration or activation procedures have been completed. Network access is associated with a subscriber or user of the mobile device 700. To identify a subscriber, the mobile device 700 requires a SIM/RUIM card 726 (i.e. Subscriber Identity Module or a Removable User Identity Module) to be inserted into a SIM/RUIM interface 728 in order to communicate with a network. The SIM card or RUIM 726 is one type of a conventional "smart card" that can be used to identify a subscriber of the mobile device 700 and to personalize the mobile device 700, among other things. Without the SIM card 726, the mobile device 700 is not fully operational for communication with the wireless network 705. By inserting the SIM card/RUIM 726 into the SIM/RUIM interface 728, a subscriber can access all subscribed services. Services may include: web browsing and messaging such as e-mail, voice mail, Short Message Service (SMS), and Multimedia Messaging Services (MMS). More advanced services may include: point of sale, field service and sales force automation. The SIM card/RUIM 726 includes a processor and memory for storing information. Once the SIM card/RUIM 726 is inserted into the SIM/RUIM interface 728, it is coupled to the main processor 702. In order to identify the subscriber, the SIM card/RUIM 726 can include some user parameters such as an International Mobile Subscriber Identity (IMSI). An advantage of using the SIM card/RUIM 726 is that a subscriber is not necessarily bound by any single physical mobile device. The SIM card/RUIM 726 may store additional subscriber information for a mobile device as well, including datebook (or calendar) information and recent call information. Alternatively, user identification information can also be programmed into the flash memory 708.

The mobile device 700 is a battery-powered device and includes a battery interface 732 for receiving one or more rechargeable batteries 730. In one or more implementations, the battery 730 can be a smart battery with an embedded microprocessor. The battery interface 732 is coupled to a regulator 733, which assists the battery 730 in providing power V+ to the mobile device 700. Although current technology makes use of a battery, future technologies such as micro fuel cells may provide the power to the mobile device 700.

The mobile device 700 also includes an operating system 734 and software components 736 to 746 which are described in more detail below. The operating system 734 and the software components 736 to 746 that are executed by the main processor 702 are typically stored in a persistent store such as the flash memory 708, which may alternatively be a read-only memory (ROM) or similar storage element (not shown). Portions of the operating system 734 and the software components 736 to 746, such as specific device applications, or parts thereof, may be temporarily loaded into a volatile store such as the RAM 706. Other software components can also be included.

The subset of software applications 736 that control basic device operations, including data and voice communication applications, will normally be installed on the mobile device 700 during its manufacture. Other software applications include a message application 738 that can be any suitable software program that allows a user of the mobile device 700 to send and receive electronic messages. Various alternatives exist for the message application 738. Messages that have been sent or received by the user are typically stored in the flash memory 708 of the mobile device 700 or some other suitable storage element in the mobile device 700. In one or more implementations, some of the sent and received messages may be stored remotely from the device 700 such as in a data store of an associated host system with which the mobile device 700 communicates.

The software applications can further include a device state module 740, a Personal Information Manager (PIM) 742, and other suitable modules (not shown). The device state module 740 provides persistence, i.e. the device state module 740 ensures that important device data is stored in persistent memory, such as the flash memory 708, so that the data is not lost when the mobile device 700 is turned off or loses power.

The PIM 742 includes functionality for organizing and managing data items of interest to the user, such as, but not limited to, e-mail, contacts, calendar events, voice mails, appointments, and task items. A PIM application has the ability to send and receive data items via the wireless network 705. PIM data items may be seamlessly integrated, synchronized, and updated via the wireless network 705 with the mobile device subscriber's corresponding data items stored and/or associated with a host computer system. The PIM 742 can create a mirrored host computer on the mobile device 700 with respect to such items. The mirrored host computer on the mobile device 700 can be particularly helpful when the host computer system is the mobile device subscriber's office computer system.

The mobile device 700 also includes a connect module 744, and an IT policy module 746. The connect module 744 implements the communication protocols that are required for the mobile device 700 to communicate with the wireless infrastructure and any host system, such as an enterprise system, with which the mobile device 700 is authorized to interface.

The connect module 744 includes a set of APIs that can be integrated with the mobile device 700 to allow the mobile device 700 to use any number of services associated with the enterprise system. The connect module 744 allows the mobile device 700 to establish an end-to-end secure, authenticated communication pipe with the host system. A subset of applications for which access is provided by the connect module 744 can be used to pass IT policy commands from the host system to the mobile device 700. Passing IT policy commands from the host system to the mobile device 700 can be done in a wireless or wired manner. The IT policy commands can then be passed to the IT policy module 746 to modify the configuration of the device 700. Alternatively, in some cases, the IT policy update can also be done over a wired connection.

The IT policy module 746 receives IT policy data that encodes the IT policy. The IT policy module 746 then ensures that the IT policy data is authenticated by the mobile device 700. The IT policy data can then be stored in the flash memory 706 in its native form. After the IT policy data is stored, a global notification can be sent by the IT policy module 746 to all of the applications residing on the mobile device 700. Applications for which the IT policy may be applicable then respond by reading the IT policy data to look for IT policy rules that are applicable.

The IT policy module 746 can include a parser 747, which can be used by the applications to read the IT policy rules. In some cases, another module or application can provide the parser. Grouped IT policy rules, described in more detail below, are retrieved as byte streams, which are then sent (recursively) into the parser to determine the values of each IT policy rule defined within the grouped IT policy rule. In one or more implementations, the IT policy module 746 can determine which applications are affected by the IT policy data and the IT policy module 746 can send a notification to only the applications that are affected by the IT policy data. In either of these cases, for applications that are not being executed by the main processor 702 at the time of the notification, the applications can call the parser or the IT policy module 746 when the applications are executed to determine if there are any relevant IT policy rules in the newly received IT policy data.

All applications that support rules in the IT Policy are coded to know the type of data to expect. For example, the value that is set for the "WEP User Name" IT policy rule is known to be a string; therefore the value in the IT policy data that corresponds to the "WEP User Name" IT policy rule is interpreted as a string. As another example, the setting for the "Set Maximum Password Attempts" IT policy rule is known to be an integer, and therefore the value in the IT policy data that corresponds to the "Set Maximum Password Attempts" IT policy rule is interpreted as an integer.

After the IT policy rules have been applied to the applicable applications or configuration files, the IT policy module 746 sends an acknowledgement back to the host system to indicate that the IT policy data was received and successfully applied.

Other types of software applications can also be installed on the mobile device 700, which can be third party applications that are added after the manufacture of the mobile device 700. Examples of third party applications include games, calculators, utilities, etc.

The additional applications can be loaded onto the mobile device 700 through at least one of the wireless network 705, the auxiliary I/O subsystem 712, the data port 714, the short-range communications subsystem 722, or any other suitable device subsystem 724. The flexibility in application installation increases the functionality of the mobile device 700 and may provide enhanced on-device functions, communication-related functions, or both. For example, secure communication applications may enable electronic commerce functions and other such financial transactions to be performed using the mobile device 700.

The data port 714 enables a subscriber to set preferences through an external device or software application and extends the capabilities of the mobile device 700 by providing for information or software downloads to the mobile device 700 other than through a wireless communication network. The alternate download path may, for example, be used to load an encryption key onto the mobile device 700 through a direct and thus reliable and trusted connection to provide secure device communication.

The data port 714 can be any suitable port that enables data communication between the mobile device 700 and another computing device. The data port 714 can be a serial or a parallel port. In some instances, the data port 714 can be a USB port that includes data lines for data transfer and a supply line that can provide a charging current to charge the battery 730 of the mobile device 700.

The short-range communications subsystem 722 provides for communication between the mobile device 700 and different systems or devices, without the use of the wireless network 705. For example, the subsystem 722 may include an infrared device and associated circuits and components for short-range communication. Examples of short-range communication standards include standards developed by the Infrared Data Association (IrDA), Bluetooth, and the 802.11 family of standards developed by IEEE.

In use, a received signal such as a text message, an e-mail message, or web page download will be processed by the communication subsystem 704 and input to the main processor 702. The main processor 702 will then process the received signal for output to the display 710 or alternatively to the auxiliary I/O subsystem 712. A subscriber may also compose data items, such as e-mail messages, for example, using the keyboard 716 in conjunction with the display 710 and possibly the auxiliary I/O subsystem 712. The auxiliary subsystem 712 may include devices such as: a touch screen, mouse, track ball, infrared fingerprint detector, or a roller wheel with dynamic button pressing capability. The keyboard 716 is preferably an alphanumeric keyboard and/or telephone-type keypad. However, other types of keyboards may also be used. A composed item may be transmitted over the wireless network 705 through the communication subsystem 704.

For voice communications, the overall operation of the mobile device 700 is substantially similar, except that the received signals are output to the speaker 718, and signals for transmission are generated by the microphone 720. Alternative voice or audio I/O subsystems, such as a voice message recording subsystem, can also be implemented on the mobile device 700. Although voice or audio signal output is accomplished primarily through the speaker 718, the display 710 can also be used to provide additional information such as the identity of a calling party, duration of a voice call, or other voice call related information.

Apparatus components of FIGS. 1 and 6-7 can be embodied as computer hardware circuitry or as a computer-readable program, or a combination of both. In another implementation, the recording apparatus is implemented in an application service provider (ASP) system.

More specifically, in the computer-readable program implementation, the programs can be structured in an object-orientation using an object-oriented language such as Java, Smalltalk or C++, and the programs can be structured in a procedural-orientation using a procedural language such as COBOL or C. The software components communicate in any of a number of means that are well-known to those skilled in the art, such as application program interfaces (API) or interprocess communication techniques such as remote procedure call (RPC), common object request broker architecture (CORBA), Component Object Model (COM), Distributed Component Object Model (DCOM), Distributed System Object Model (DSOM) and Remote Method Invocation (RMI). The components execute on as few as one computer as in general computer environment 600 in FIG. 6, or on at least as many computers as there are components.

CONCLUSION

A system that filters content of ambiguous domain is described. A technical effect of the system is replacement in packets of the destination IP address with a uniquely identifiable IP address on a local subnet. Although specific implementations have been illustrated and described herein, it will be appreciated by those of ordinary skill in the art that any arrangement which is calculated to achieve the same purpose can be substituted for the specific implementations shown. This disclosure is intended to cover any adaptations or variations. For example, although described in procedural terms, one of ordinary skill in the art will appreciate that implementations can be made in an object-oriented design environment or any other design environment that provides the required relationships.

In particular, one of skill in the art will readily appreciate that the names of the methods and apparatus are not intended to limit implementations. Furthermore, additional methods and apparatus can be added to the components, functions can be rearranged among the components, and new components to correspond to future enhancements and physical devices used in implementations can be introduced without departing from the scope of implementations. One of skill in the art will readily recognize that implementations are applicable to future communication devices, different file systems, and new data types.

The terminology used in this disclosure is meant to include all filtering policies, filtering appliances and network environments and alternate technologies which provide the same functionality as described herein.

The invention claimed is:

1. A computer-implemented method executed by one or more hardware processors, the method comprising:
   receiving, at a domain name server, a request from a client to resolve a domain name into a corresponding Internet Protocol (IP) address;
   determining that the corresponding IP address corresponds to the domain name and at least one other domain name;
   in response to receiving the request to resolve the domain name and in response to determining that the corresponding IP address corresponds to the domain name and the at least one other domain name, associating, by the domain name server, a spoofed IP address with the domain name, wherein the spoofed IP address is configured to uniquely identify the domain name and is associated with a particular server, and wherein the spoofed IP address is different than the corresponding IP address;

in response to associating the spoofed IP address with the domain name, sending, by the domain name server, a response to the request to resolve the domain name to the client, the response including the spoofed IP address;

receiving, at the particular server, an encrypted request for a resource, the encrypted request directed to the spoofed IP address; and determining, by the particular server, that the encrypted request is directed to the domain name based on the association between the spoofed IP address and the domain name, wherein the determination by the particular server is made without decrypting the encrypted request.

2. The method of claim 1, further comprising:
selectively allowing the encrypted request based at least in part on determining that the encrypted request is directed to the domain name.

3. The method of claim 2, wherein selectively allowing the encrypted request includes:
determining that the encrypted request should be blocked based at least in part on a rule associated with the domain name; and
blocking the encrypted request.

4. The method of claim 2, wherein selectively allowing the encrypted request includes:
determining that the encrypted request should be allowed based at least in part on a rule associated with the domain name; and
forwarding the encrypted request to the corresponding IP address for the domain name.

5. The method of claim 1, wherein:
the spoofed address includes an internet protocol (IP) address,
receiving the request to resolve the domain name includes receiving a Domain Name System (DNS) request, and
sending the response to the request to resolve the domain name includes sending a DNS response.

6. The method of claim 1, wherein the domain name is a first domain name, the method further comprising:
receiving a request to resolve a second domain name different than the first domain name;
determining that a corresponding IP address to the second domain name corresponds only to the second domain name; and
sending a response to the request to resolve the second domain name, the response including the corresponding IP address for the second domain name.

7. The method of claim 1, further comprising:
receiving a second request to resolve the domain name;
determining that the domain name is associated with the spoofed IP address; and
sending a response to the second request to resolve the domain name, the response including the spoofed IP address.

8. The method of claim 1, wherein the spoofed IP address includes an IP port.

9. The method of claim 1, wherein receiving the encrypted request for the resource includes receiving a request according to Hypertext Transfer Protocol Secure (HTTPS).

10. A non-transitory, computer-readable medium storing instructions operable when executed to cause at least one hardware processor to perform operations comprising:
receiving, at a domain name server, a request from a client to resolve a domain name into a corresponding Internet Protocol (IP) address;
determining that the corresponding IP address corresponds to the domain name and at least one other domain name;
in response to receiving the request to resolve the domain name and in response to determining that the corresponding IP address corresponds to the domain name and the at least one other domain name, associating, by the domain name server, a spoofed IP address with the domain name, wherein the spoofed IP address is configured to uniquely identify the domain name and is associated with a particular server, and wherein the spoofed IP address is different than the corresponding IP address;
in response to associating the spoofed IP address with the domain name, sending, by the domain name server, a response to the request to resolve the domain name to the client, the response including the spoofed IP address;
receiving, at the particular server, an encrypted request for a resource, the encrypted request directed to the spoofed IP address; and
determining, by the particular server, that the encrypted request is directed to the domain name based on the association between the spoofed IP address and the domain name, wherein the determination by the particular server is made without decrypting the encrypted request.

11. The non-transitory computer-readable medium of claim 10, the operations further comprising:
selectively allowing the encrypted request based at least in part on determining that the encrypted request is directed to the domain name.

12. The non-transitory computer-readable medium of claim 11, wherein selectively allowing the encrypted request includes:
determining that the encrypted request should be blocked based at least in part on a rule associated with the domain name; and
blocking the encrypted request.

13. The non-transitory computer-readable medium of claim 11, wherein selectively allowing the encrypted request includes:
determining that the encrypted request should be allowed based at least in part on a rule associated with the domain name; and
forwarding the encrypted request to the corresponding IP address for the domain name.

14. The non-transitory computer-readable medium of claim 10, wherein:
the spoofed address includes an internet protocol (IP) address,
receiving the request to resolve the domain name includes receiving a Domain Name System (DNS) request, and
sending the response to the request to resolve the domain name includes sending a DNS response.

15. The non-transitory computer-readable medium of claim 10, wherein the domain name is a first domain name, the non-transitory computer-readable medium further comprising:
receiving a request to resolve a second domain name different than the first domain name;

determining that a corresponding IP address to the second domain name corresponds only to the second domain name; and sending a response to the request to resolve the second domain name, the response including the corresponding IP address for the second domain name.

16. The non-transitory computer-readable medium of claim 10, the operations further comprising:

receiving a second request to resolve the domain name;

determining that the domain name is associated with the spoofed IP address; and sending a response to the second request to resolve the domain name, the response including the spoofed IP address.

17. The non-transitory computer-readable medium of claim 10, wherein the spoofed IP address includes an IP port.

18. The non-transitory computer-readable medium of claim 10, wherein receiving the encrypted request for the resource includes receiving a request according to Hypertext Transfer Protocol Secure (HTTPS).

19. A system comprising:

memory for storing data; and one or more hardware processors operable to perform operations comprising:

receiving, at a domain name server, a request from a client to resolve a domain name into a corresponding Internet Protocol (IP) address;

determining that the corresponding IP address corresponds to the domain name and at least one other domain name;

in response to receiving the request to resolve the domain name and in response to determining that the corresponding IP address corresponds to the domain name and the at least one other domain name, associating, by the domain name server, a spoofed IP address with the domain name, wherein the spoofed IP address is configured to uniquely identify the domain name and is associated with a particular server, and wherein the spoofed IP address is different than the corresponding IP address;

in response to associating the spoofed IP address with the domain name, sending, by the domain name server, a response to the request to resolve the domain name to the client, the response including the spoofed IP address;

receiving, at the particular server, an encrypted request for a resource, the encrypted request directed to the spoofed IP address; and determining, by the particular server, that the encrypted request is directed to the domain name based on the association between the spoofed IP address and the domain name, wherein the determination by the particular server is made without decrypting the encrypted request.

20. The system of claim 19, the operations further comprising:

selectively allowing the encrypted request based at least in part on determining that the encrypted request is directed to the domain name.

21. The system of claim 20, wherein selectively allowing the encrypted request includes:

determining that the encrypted request should be blocked based at least in part on a rule associated with the domain name; and blocking the encrypted request.

* * * * *